United States Patent
Fiorone et al.

(10) Patent No.: US 10,218,568 B2
(45) Date of Patent: Feb. 26, 2019

(54) METHOD AND A DEVICE FOR PROVISIONING CONTROL PLANE IN MULTI-TECHNOLOGY NETWORK

(71) Applicant: Telefonaktiebolaget LM Ericsson (publ), Stockholm (SE)

(72) Inventors: Raoul Fiorone, Genoa (IT); Daniele Ceccarelli, Genoa (IT); Andrea Corti, Genoa (IT); Riccardo Martinotti, Genoa (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 15/036,065

(22) PCT Filed: Nov. 12, 2013

(86) PCT No.: PCT/EP2013/073588
§ 371 (c)(1),
(2) Date: May 12, 2016

(87) PCT Pub. No.: WO2015/070892
PCT Pub. Date: May 21, 2015

(65) Prior Publication Data
US 2016/0294615 A1    Oct. 6, 2016

(51) Int. Cl.
*H04J 14/02* (2006.01)
*H04L 12/24* (2006.01)
(Continued)

(52) U.S. Cl.
CPC ..... *H04L 41/0806* (2013.01); *H04B 10/2581* (2013.01); *H04B 10/27* (2013.01);
(Continued)

(58) Field of Classification Search
CPC . H04L 12/4633; H04L 67/1097; H04L 63/20; H04L 63/08; H04L 63/10;
(Continued)

(56) References Cited

U.S. PATENT DOCUMENTS 8,667,399 B1 * 3/2014 Brandwine ............. H04L 41/22
                                                        715/738
8,954,978 B1 * 2/2015 Brandwine ......... G06F 9/45533
                                                        709/226
(Continued)

FOREIGN PATENT DOCUMENTS

EP    1585298 A1    10/2005
EP    2267954 A1    12/2010
(Continued)

OTHER PUBLICATIONS

PCT International Search Report, dated Mar. 3, 2014, in connection with International Application No. PCT/EP2013/073588, all pages.
(Continued)

*Primary Examiner* — Don N Vo
(74) *Attorney, Agent, or Firm* — Leffler Intellectual Property Law, PLLC (57) ABSTRACT

A method of provisioning a control plane in a multi-technology network in response to a first connection request received from a client. The method comprises receiving the first connection request at a control plane dispatcher; analysing said first connection request and selecting a control plane based on results of the analysis and characteristics of control planes at the disposal of the dispatcher in the multi-technology network. The control plane dispatcher selects on a per connection request basis what is the best technology for that request and its requirements, taking also into account the status of the network resources.

20 Claims, 6 Drawing Sheets

(51) Int. Cl.
*H04B 10/2581* (2013.01)
*H04B 10/27* (2013.01)
*H04L 12/66* (2006.01)
*H04L 12/723* (2013.01)

(52) U.S. Cl.
CPC .......... *H04J 14/0227* (2013.01); *H04L 12/66* (2013.01); *H04L 45/50* (2013.01)

(58) Field of Classification Search
CPC ..... H04L 41/0806; H04L 45/50; H04L 12/66; G06F 2009/45595; G06F 3/067; G06F 9/45558; H04B 10/27; H04B 10/2581; H04J 14/0227
USPC .......................................................... 398/79
See application file for complete search history.

(56) References Cited

U.S. PATENT DOCUMENTS

| | | | | |
|---|---|---|---|---|
| 9,310,864 | B1* | 4/2016 | Klein | G06F 1/26 |
| 2005/0153687 | A1* | 7/2005 | Niemenmaa | H04L 12/2854 |
| | | | | 455/414.2 |
| 2005/0192004 | A1* | 9/2005 | Witzel | H04W 88/14 |
| | | | | 455/428 |
| 2006/0153070 | A1* | 7/2006 | DelRegno | H04M 3/2254 |
| | | | | 370/229 |
| 2007/0058607 | A1* | 3/2007 | Mack-Crane | H04L 45/12 |
| | | | | 370/351 |
| 2015/0023354 | A1* | 1/2015 | Li | H04L 49/65 |
| | | | | 370/392 |

FOREIGN PATENT DOCUMENTS

| | | |
|---|---|---|
| WO | 2006070197 A2 | 7/2006 |
| WO | 2011128002 A1 | 10/2011 |

OTHER PUBLICATIONS

Luis Velasco et al., Cross-Stratum Orchestration and Flexgrif Optical Networks for Data Center Federations, IEEE Network, IEEE Service Center, New York, NY, US, vol. 27, No. 6, Nov. 1, 3013, pp. 23-30.

Raul Munoz et al., Idealist Control and Service Management Solutions for Dynamic and Adaptive Flexi-grid DWDM Networks, Future Network & Mobile Summit 2013 Conference Proceedings, Jul. 3, 2013, pp. 1-10.

* cited by examiner

↕ Control Plane UNI Relationship

METHOD AND A DEVICE FOR PROVISIONING CONTROL PLANE IN MULTI-TECHNOLOGY NETWORK

TECHNICAL FIELD

The present invention relates to control plane in communications networks, in general, and in particular to a method and a device for provisioning a control plane in a multi-technology network.

BACKGROUND

Packet networks and optical networks are evolving towards convergence. Multi-technology networks where packets, Optical Transport Networks (OTN) as well as Wavelength-division Multiplexing (WDM) co-exist are already available in the market. Internet Protocol (IP) over WDM (IPoWDM) is becoming a reality. This clear market trend aims at simplifying networks, making them more efficient, and enabling mixing in the same platform different technologies which used to be supported on separate platforms.

Control plane plays an important role in this landscape, where the coexistence and convergence of different technologies requires higher automation to effectively decrease operational expenditure (Opex) and take full advantage of the converged network. In the existing multi-technology networks the approach to control plane is on per-technology basis, with IP/MPLS (Multiprotocol Label Switching), OTN and WDM each with its own control plane.

Figure 10:
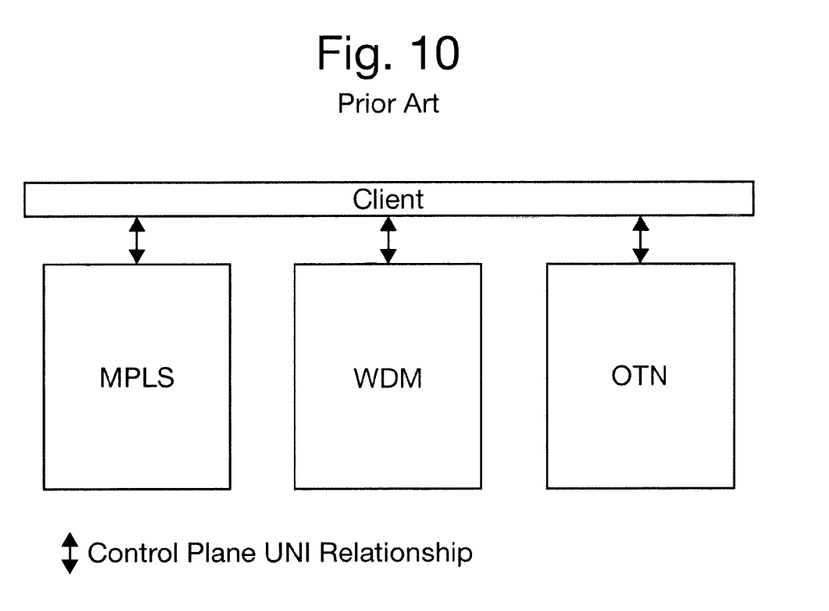
FIG. 10 is a diagram illustrating a known method of provisioning a control plane in a multi-technology network.

In FIG. 10 an illustration of the current approach to multi-technology platforms and networks is illustrated. A client request is handled by a pre-determined manual configuration, by one of the available control planes (MPLS control plane, WDM control plane or the OTN control plane) and this choice is made based on a-priori considerations. The result of this approach is that normally multi-technology networks actually use a single control plane, thus failing to exploit the full potentials of the network.

SUMMARY

It is the object of the present invention to obviate at least some of the above disadvantages and provide an improved method of provisioning control plane to connection requests in multi-technology communications networks with plurality of control planes.

According to a first aspect of the present invention there is provided a method of provisioning a control plane in a multi-technology network in response to a first connection request from a client. The method comprises receiving the first connection request at a control plane dispatcher and analysing said first connection request. The method further comprises selecting a control plane based on results of the analysis and characteristics of control planes at the disposal of the dispatcher in the multi-technology network.

According to a second aspect of the present invention there is provided a dispatcher for provisioning a control plane in a multi-technology network. The dispatcher comprises a processor and a memory. Said memory contains instructions executable by said processor whereby said dispatcher is operative to receive a first connection request from a client and analyse said first connection request. The dispatcher is further operative to select a control plane based on results of the analysis and characteristics of control planes at the disposal of the dispatcher in the multi-technology network.

According to a third aspect of the present invention there is provided a network element comprising a control plane dispatcher as defined above.

Further features of the present invention are as claimed in the dependent claims.

Advantageously the present invention in its embodiments allows for automation of selecting control plane, which, in turn, simplifies creation of connectivity because the operator is not forced to identify in advance the technology and then accommodate given services. Instead, according to initial conditions the best choice is selected. The transport technology to be used is not based on an a priori decision: optimum choice is based on real parameters such as customer requirements and service level agreement.

BRIEF DESCRIPTION OF THE DRAWINGS

The present invention will be understood and appreciated more fully from the following detailed description taken in conjunction with the drawings in which.

DETAILED DESCRIPTION

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

A cost function, in a simple implementation, could be the hop count or physical length of the link. In other implementations delay, jitter, packet loss, load balance can be incorporated into the cost function. In other alternative embodiments a cost function may be defined as a weighted sum of a plurality of factors (e.g., latency, packet loss, hop count, jitter, flow balance, link utilization, etc.) or alternatively, the cost function may also be a non-linear function of these or other factors.

Existing solutions for control plane in a converged environment cannot fully exploit the advantages of multi-technology and thus fail to provide network operators with the full range of benefits they could get. More specifically, with existing solutions the network operator needs to decide manually and beforehand how a given connection request from a client will be handled at the data plane level and thus which technology and control plane will take care of it. The relationship is static and, for a given client traffic which requests a connection, the network really looks mono-dimensional if not mono-technology. Given that a technology-specific UNI (User to Network Interface), e.g. WDM, will be actually used and the control plane of that specific layer will handle it irrespective of whatever other technology is supported at the very same moment in the same box. This also implies that the resources of the network cannot really be optimised globally but again layer by layer, as if they were separated. From a business perspective there is also little chance for differentiation and evolved business models, since every connection actually sees the "same network" and the relevant Service Level Agreements (SLA) can be signed using a known and fairly classical model (i.e. based on a simple set of parameters like delay, loss etc.).

As mentioned earlier, FIG. 10 shows the current approach to multi-technology networks. A client request is handled according to a pre-determined manual configuration, by either the MPLS Control Plane or the WDM Control Plane or the OTN Control Plane. This choice has to be made based on a-priori considerations.

The basic concept of the present invention is to evolve the know approach to allocate a control plane in case of multi-technology network by adding a control plane dispatcher, whose role is to add the automation and the necessary intelligence to select the best technology and related control plane to be used for a given connection request. A simple graphical illustration of an embodiment of this invention is presented in FIG. 3, where the client 302 is separated from the various technologies available in the multi-technology network and their control planes 304, 306 and 308 by the dispatcher 300. As can be appreciated a client connection request does not see a single technology network, but is handled by the dispatcher 300. In this configuration the client traffic can really take full advantage of the network technologies at the disposal of the dispatcher in a completely agnostic way.

This approach does not require a complete revolution in the control plane arena but allows for using the same per-technology building blocks (individual control planes) with the addition of the missing intelligence to really exploit technology convergence from both data plane and control plane perspectives.

Figure 3:
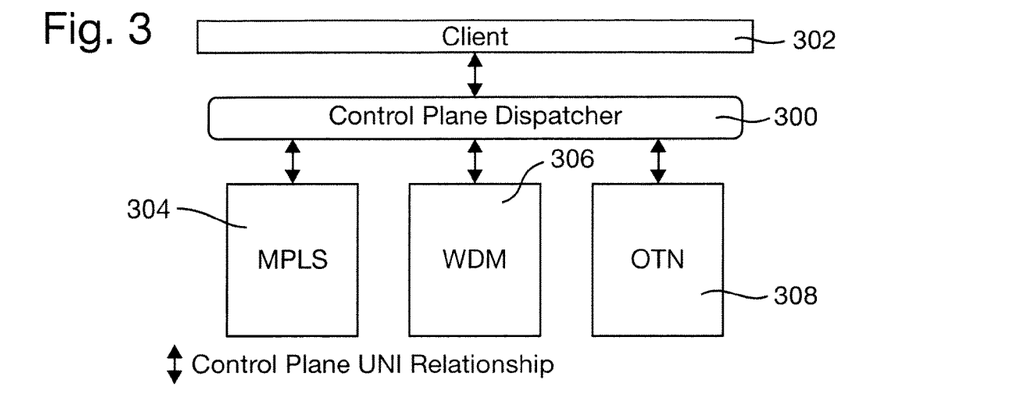
FIGS. 3-5 are diagrams illustrating basic principles of implementation of the method in embodiments of the present invention.

The control plane dispatcher, 300, selects on a per connection request basis what is the best technology for that request and its requirements, preferably taking also into account the status of the network resources. Indeed, the control plane dispatcher 300 allows not to determine beforehand how a connection will be handled but to automate this selection process based on a variety of parameters, which may be included in the Service Level Agreement, and also on the best utilization of the network resources to meet the requirements of that specific connection request.

In this way more sophisticated business models can also be developed, since the same type of request can be satisfied by different technologies, and thus be differentiated from a business perspective.

In various embodiments of the present invention the dispatcher 300 may be implemented in different network elements.

In embodiments of the present invention the dispatcher acts as an expert system to determine the best set of resources to be used for provisioning of control plane in order to answer to a client's request for connection. The requested connection may be related to different technologies, which range from IP (Internet Protocol) to SDH (Synchronous Digital Hierarchy). Metro Ethernet Forum (MEF) describes different kinds of Ethernet connectivity services, here for simplicity a point-to-point (E-Line) is used, although the invention is applicable also to other services (including E-LAN, E-Tree, E-Access).

Figure 4:
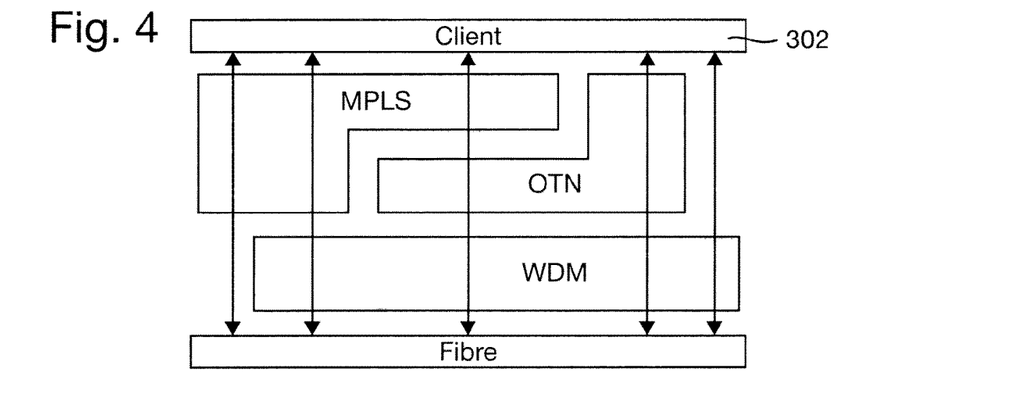
Figure 5:
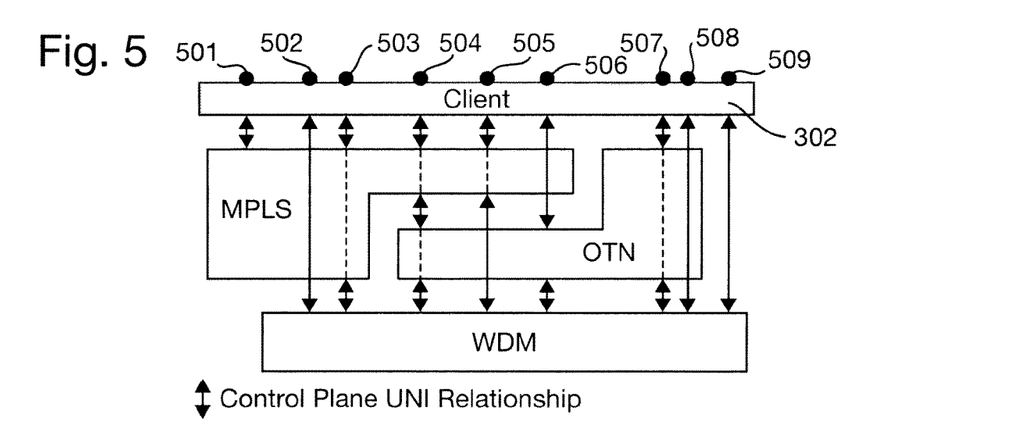

It is clear that the number of combinations of possible control plane requests for the different data plane options in a multi-technology network is high. An example of a multi-technology network offering connections using MPLS, OTN and WDM is illustrated in FIG. 4. Depending on particular connection within the multi-technology network connection on the data plane level may be realised by combination of various technologies. As can be seen in FIG. 4 there is five possible options for data plane relationships. When control plane is considered the number of possible combinations is even greater. FIG. 5 illustrates nine options 501-509.

In the solutions known in the art the choice of control plane for a given connection request is made by the operator based on past experience or direct request from the user. When different layers are involved the choice cannot be simple particularly in case it needs to match customer requirements and network capability. Connectivity request handling can be simplified and automated with the introduction of the dispatcher 300.

For sake of simplicity and brevity of explanation in FIG. 3 only a single-layer option is represented while in FIG. 4 and FIG. 5 a plurality of relationships with multi-layer technology is shown. When a path is created through a multi-technology network the nodes along the path can provide a plurality of control planes and the final choice made by the dispatcher 300 depends on the connection request and what the network can provide. In FIG. 5 the dashed sections mean that there is peering with control plane of the relevant technology; for example, difference between 502 and 503 is that in the case of 502 there is only a WDM UNI (User to Network Interface) and no MPLS involvement from a control plane perspective, while in the case of 503 there is also an MPLS UNI, which means that the MPLS control plane could be used in this case. Elements 501 and 503 look the same from an MPLS perspective (both can provide MPLS control plane), but 503 has a WDM UNI relationship as well, which means element 503 can also provide WDM control plane. In the 502 example WDM control plane is selected and provisioned, in 503 either the MPLS control plane or the WDM control plane can be provisioned.

There are several options to transport a client signal across the multi-technology network, depending on the client-server relationship of the technologies, which are available in part or the whole infrastructure of the multi-technology network.

Figure 6:
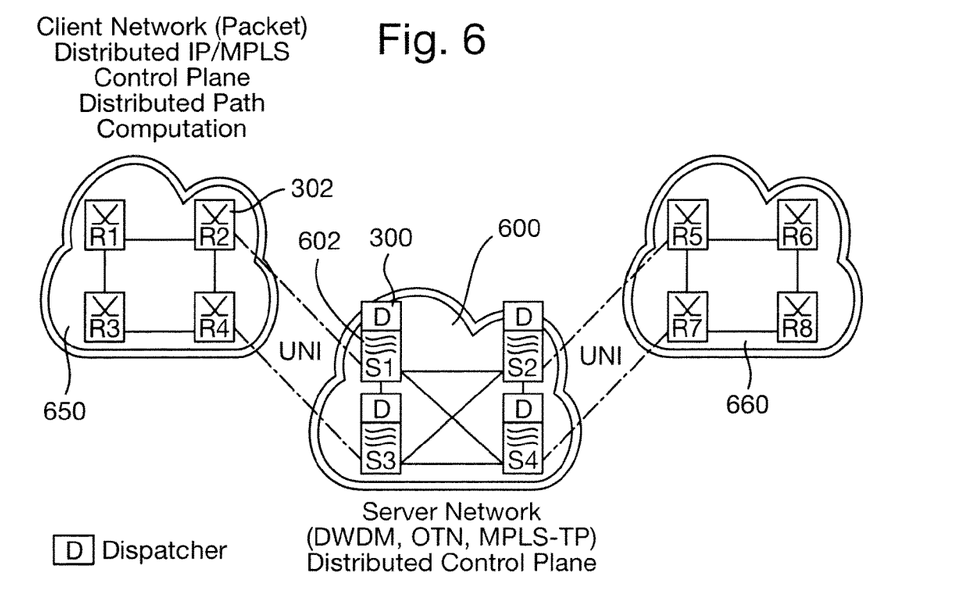
FIGS. 6-8 are diagrams illustrating implementation of the method in embodiments of the present invention in different network scenarios.

In one embodiment, in which the multi-technology communications network (alternative name used is server network) implements a distributed control plane. In this embodiment, illustrated in FIG. 6, each network element (server), 602, of the multi-technology communications network (server network) 600 comprises a dispatcher 300. A first connection requests is received from a client network (router 302 in the example illustrated in FIG. 6) and is handled by the dispatcher 300 in the network element 602 in the server network 600. With reference to FIG. 6 the server network 600 provides a connection path between the two client networks (650 and 660). For instance, it could be a metro network connecting two access networks or equivalently a backbone network connecting two metro networks.

Figure 1:
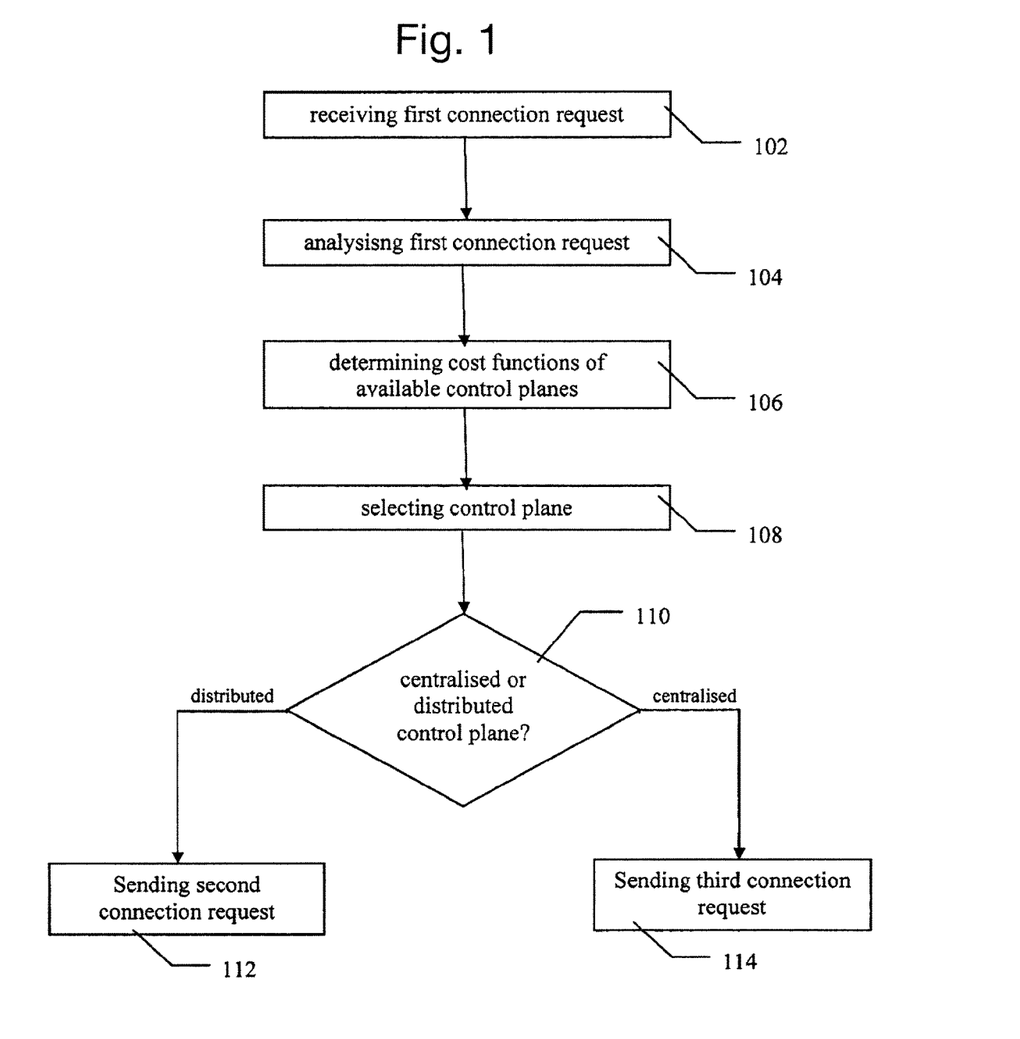
FIG. 1 is a flow chart illustrating method of provisioning a control plane in a multi-technology network in one embodiment of the present invention.
Figure 7:
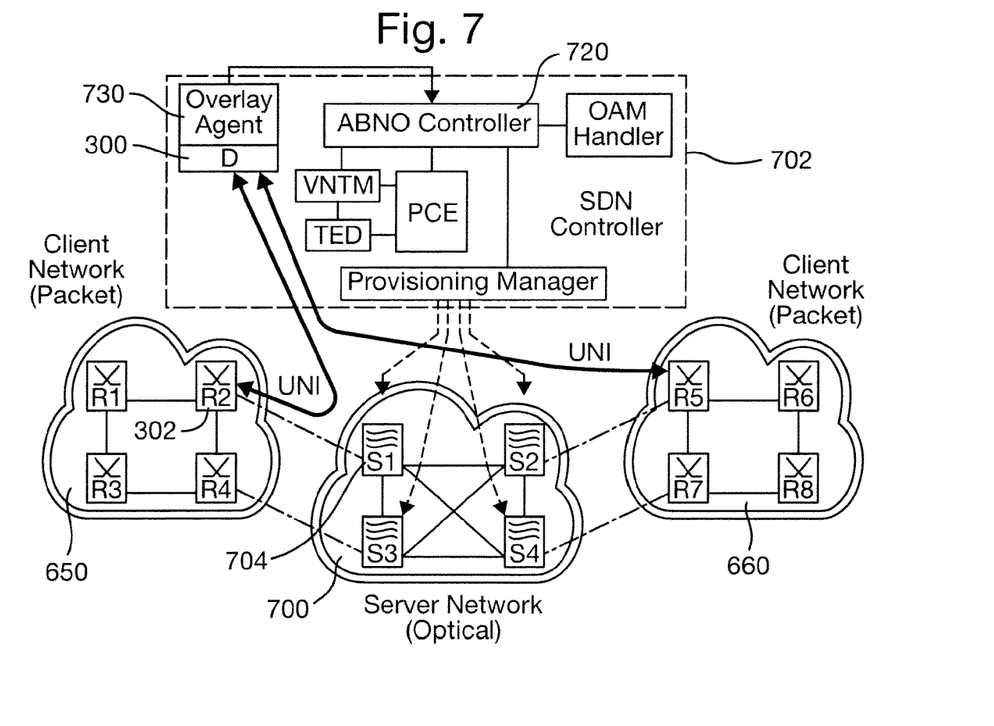

In an alternative embodiment, illustrated in FIG. 7 and in FIG. 1, control plane is centralised in a central controller 702 (SDN controller in the embodiment illustrated in FIG. 7) and the dispatcher 300 is implemented as part of this central controller 702. A first connection requests is received from a client network (router 302 in the example illustrated in FIG. 7) and is handled by the dispatcher 300 in the central controller 702 in the server network 700.

Figure 8:
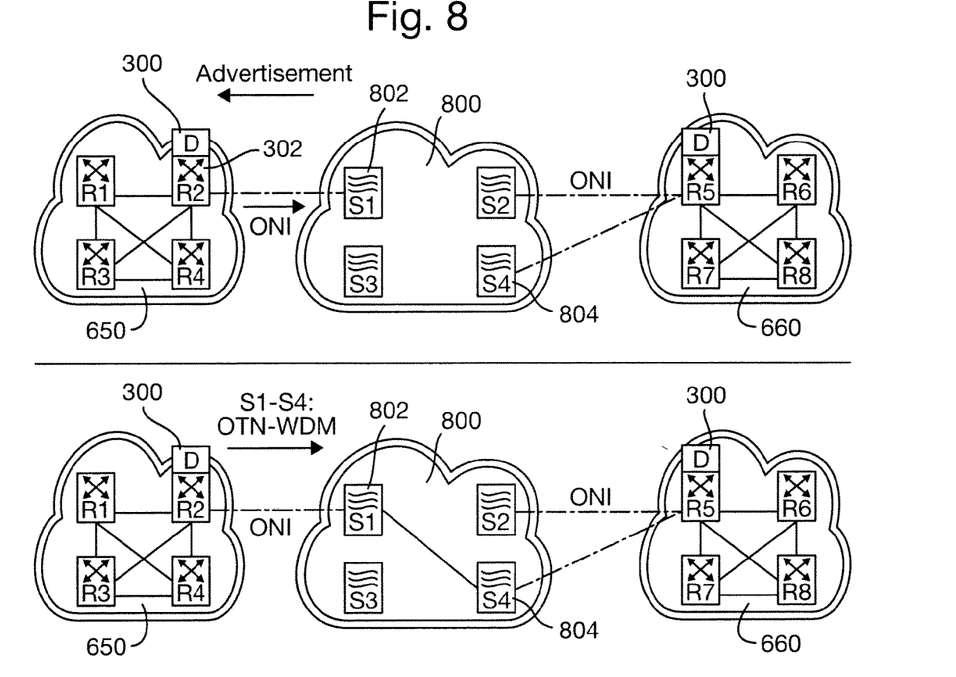

In yet another embodiment, illustrated in FIG. 8, a dispatcher 300 is implemented in an edge node 302 in a client network 300. In a one embodiment the edge node 302 is a router and in the following description the term edge router will be used. A first connection requests is received by the edge router 302 and is handled by the dispatcher 300 implemented in this edge router before it is sent to the server network 800.

With reference to FIG. 1 and FIG. 6 a method of provisioning a control plane in a multi-technology network 600 will be discussed. Provisioning of the control plane is initiated by a first connection request from an edge router 302 operating in client network 650 as illustrated in FIG. 6. In this embodiment the control plane is distributed and the first connection request is received by a network element in the multi-technology network 600. Because network elements of the multi-technology network 600 are configured to offer connections across the network 600 using different technologies (e.g. DWDM, OTN, MPLS) relationship between the edge router 302 and network element 602 is one based on the known client-server model in which the edge router 302 is the client (it needs a connection across network 600) and the network element 602 is the server (it can provision the connection using the technologies at its disposal). In consequence the network 650 is also referred to as the client network and the multi-technology network 600 is also known as the server network. The method comprises receiving 102 the first connection request at a control plane dispatcher 300. In the embodiment with a distributed control plane the dispatcher 300 is implemented in the network element 602. In fact, because the control plane is distributed, each network element operating as a server comprises its own instance of the dispatcher 300. It is envisaged that in some embodiments of the present inventions not all network elements in the multi-technology network 600 will have the dispatcher 300 implemented. The network elements in the network 600 without a dispatcher will operate according to the method known in the art and discussed in the background section. This sub-optimal implementation is possible in situations where, for example, the network is gradually upgraded by adding the dispatcher functionality or in situations where some of the network elements operating in the network 600 do not have adequate processing power in order for the dispatcher to be implemented.

In the next step of the method the first connection request is analysed, 104, and then, based on results of the analysis and characteristics of control planes at the disposal of the dispatcher in the multi-technology network 600 a control plane is selected for the first connection request.

In one embodiment the first connection request may be very simple, for example, a client A in the network 650 requests a path to a client B in the network 660 and there is no requirement at all associated with the request—i.e. the only thing that matters is that A is connected to B in response to said connection request. In this embodiment the dispatcher 300 only needs to know that the connection is from client A to client B. In one embodiment the dispatcher knows technologies (or combination of technologies) to be used on various possible paths to the client B as well as status of network resources along these paths and selects a control plane with, for example, the lowest number of hops. In alternative embodiments other criteria may be used by the dispatcher 300.

However, in an alternative embodiment the step of analysis, 104, comprises analysing requirements associated with said first connection request. This is when the connection request is not a simple "connect me to B", but more specific requirements are associated with it (e.g. related to protection, restoration, parameters of the connection like jitter, latency, etc.). In this embodiment the dispatcher has more parameters to consider in selecting the one control plane that will best serve the particular request. Preferably, constraints of the multi-technology network 600 are considered in the step of selecting 108 a control plane in response to the first connection request.

As a result of the method an optimal selection of the control plane is achieved, which takes into account specifics of the connection request and what the server node has to offer. This is in stark contrast to the solution known in the art in which a connection request is handled based on a manual configuration by one of the available control planes without any consideration of the actual connection request.

Preferably, the method comprises determining 106 cost functions for the different control planes available in the multi-technology network 600. Since the cost functions are determined in the same way for the available control planes it is possible to compare their values. Cost function is a very good measure of a control plane characteristics which otherwise could not be compared. Once the cost functions are known the dispatcher 300 uses values of these cost functions in the step of selecting 108 a control plane for the first connection request. In one embodiment, the control plane characterised by a lowest cost function value is selected 108. In an alternative embodiment control planes having cost functions values below a threshold are "shortlisted" and final selection is made based on traffic load handled currently by the shortlisted technologies in the network 600. In this way load balance between the various technologies can also be achieved, or at least improved. In alternative embodiments criteria other than traffic load are considered is selecting the control plane.

In one embodiment the dispatcher 300 in order to find the best control plane uses a cost function, depending on:
 client parameters: e.g. Class of Service, maximum Delay, availability (max outage), restoration time;
 server network constraints: e.g. available resources, compatibility, link cost, shared risk ling group (SRLG);
 server network provider preferences: e.g. technology to be used, resource occupation strategy (distributed vs packed), business implications.

In a preferred embodiment the constraints are used to define what service can be guaranteed and over which technology. Then, preferably, in case more than one technology can satisfy the requirements, the server network provider (operator) can chose which technology is more effective (preferred) from its point of view.

As mentioned earlier, in the scenario illustrated in FIG. 4 the number of possible combinations of control planes is nine, 501-509. This is illustrated in FIG. 5 and some of these options are described in more detail:

- 502 is the best choice for these constraints: UNI vs NNI (MPLS can extend over WDM and non-WDM domains), sub-lambda multiplexing, critical or not critical resiliency (WDM protection or restoration)
- 507 is the best choice for these constraints: minimum delay variation, critical resiliency and resource sharing (one transponder instead of two; OTN protection and WDM restoration)
- 508 is the best choice for these constraints: minimum delay variation, long distance (Forward Error Correction), sub-lambda multiplexing, critical or not critical resiliency (WDM protection or restoration)
- 509 is the best choice for these constraints: minimum delay, minimum delay variation, critical or not critical resiliency (WDM protection or restoration)

Based on the characteristics listed above the dispatcher 300 choses the best technology that satisfies the requirements. The above characteristics are examples of points that determine a given option as the best control plane solution for a given client traffic.

In alternative embodiments other parameters may be added to the cost function, which is calculated for each of the combinations of Control Plane requests.

In the case of a distributed control plane (e.g. GMPLS) in the network elements of the multi-technology network 600, each node is provided with a dispatcher 300 as explained earlier. In this embodiment a UNI (User to Network Interface) connection requests coming from an IP router (client) 302 is received by the dispatcher 300, processed as discussed above and then a second connection request is sent, 112, to a server associated with the technology selected by the dispatcher 300 as best serving the connection request. The second connection request is representative of the first connection request received from the client. In some embodiments the second connection request may be exactly the same as the first connection request; it will simply be sent to the server that offers the selected control plane. However, it is also possible that the dispatcher modifies the first connection request and creates in this way the second connection request. For example the dispatcher can chose a control plane different than the one identified in the original request because the new control plane better fulfils requirements of the connection request.

In practice, since the dispatcher 300 is implemented in a server 602 the second connection request is sent from the dispatcher 300 to the server 602 that hosts said dispatcher. Because this is a multi-technology network with various technologies converging at the server nodes in network 600 (also in networks 700 and 800 in alternative embodiments) the server node comprises various servers offering the transport technologies converged at the server 602 (e.g. WDM server, MPLS server, OTN server). Although this is done locally to the node where the request is being processed it has a network-wide effect since the selected control plane will actually handle the second connection request across the network 600.

Once the second connection request is received by the server 602 offering the selected control plane a connection through the server network is set-up using the selected technology.

As briefly discussed earlier in an alternative embodiment with a multi-technology network 700 with a centralised control plane illustrated in FIG. 7 the dispatcher 300 is implemented as part of the central controller 702. A first connection requests is received from a client network (router 302 in the example illustrated in FIG. 7) by a server node 704 and is forwarded to the central controller 702. In contrast to the distributed control plane the first connection request is not processed by the server node that received it, but simply forwarded for processing to the central controller 702. The dispatcher 300 receives 102 the first connection request analyses 104 the first connection request and selects 108 one of the available control planes that will best serve the first connection request. These operations in the dispatcher 300 are performed in the same way as in the embodiment with the distributed control plane.

The step of analysis 104 comprises analysing requirements associated with said first connection request and in the step of selecting of the control plane constraints of the multi-technology network 700 are considered. Determining 106 cost functions for control planes available in the multi-technology network 700 and using the cost functions in the step of selecting 108 is performed in the same way as in the embodiment with a distributed control plane. In one embodiment the control plane characterised by a lowest cost function is selected 108, but embodiments in which cost functions below a threshold are "shortlisted" are also envisaged.

Once the control plane is selected the method comprises sending to a controller 720 of the multi-technology network 700 a third connection request 114 as well as an indication of the control plane selected in response to the first connection request. The third connection request is representative of the first connection request. Depending on details of the embodiment the indication of the selected control plane is separate from the third connection request, i.e. accompanies the third connection request or is a part of the third connection request. In this way, in some embodiments the third connection request may be exactly the same as the first connection request, but it is also possible that the dispatcher modifies the first connection request, e.g. by adding information about the selected control plane, and creates in this way the third connection request before sending the it to the controller 720.

In one implementation of the multi-technology network 700 the central controller 702 is a SDN controller (Software-defined Networking). The SDN controller comprises a specialised unit responsible for actual control of the network known as ABNO (Application Based Network Operations) controller 720. In alternative embodiments the central controller may be implemented differently, what is important, however, is that the central controller as well as the dispatcher are centralised entities. In some embodiments, the dispatcher may be even implemented as a device separate from the central controller. In these embodiments it is necessary to direct connection requests that normally would go to the central controller to the dispatcher 300. Once processed by the dispatcher the third connection request is sent to the ABNO controller 720.

In SDN environment the UNI requests coming from the router (client) is forwarded by a server node 704 to the SDN controller 702 where it is intercepted by an overlay agent 730, which is a module in charge of intercepting the client layer UNI requests and asking the ABNO controller (the intelligence of the SDN controller 702) to accommodate these requests. The present invention, when implemented in an SDN environment, adds the dispatcher 300 to the overlay agent 730 and its role is to determine which control layer available across the transport nodes best meets the requirements of the connection request. In one embodiment the dispatcher 300 sends the third connection request and associated indication of the selected control plane to the ABNO controller 720. In alternative embodiment the dispatcher 300 instructs the overlay agent 730 to send said third connection request to the ABNO controller 720. In FIG. 7 the SDN controller 702 is drawn based on the IETF (Internet Engineering Task Force) ABNO architecture, but the concept is applicable to any SDN architecture.

In a preferred embodiment the first connection request is received over a User to Network Interface (UNI). Embodiments based on UNI interface are possible in the centralised and distributed control plane scenarios.

Figure 2:
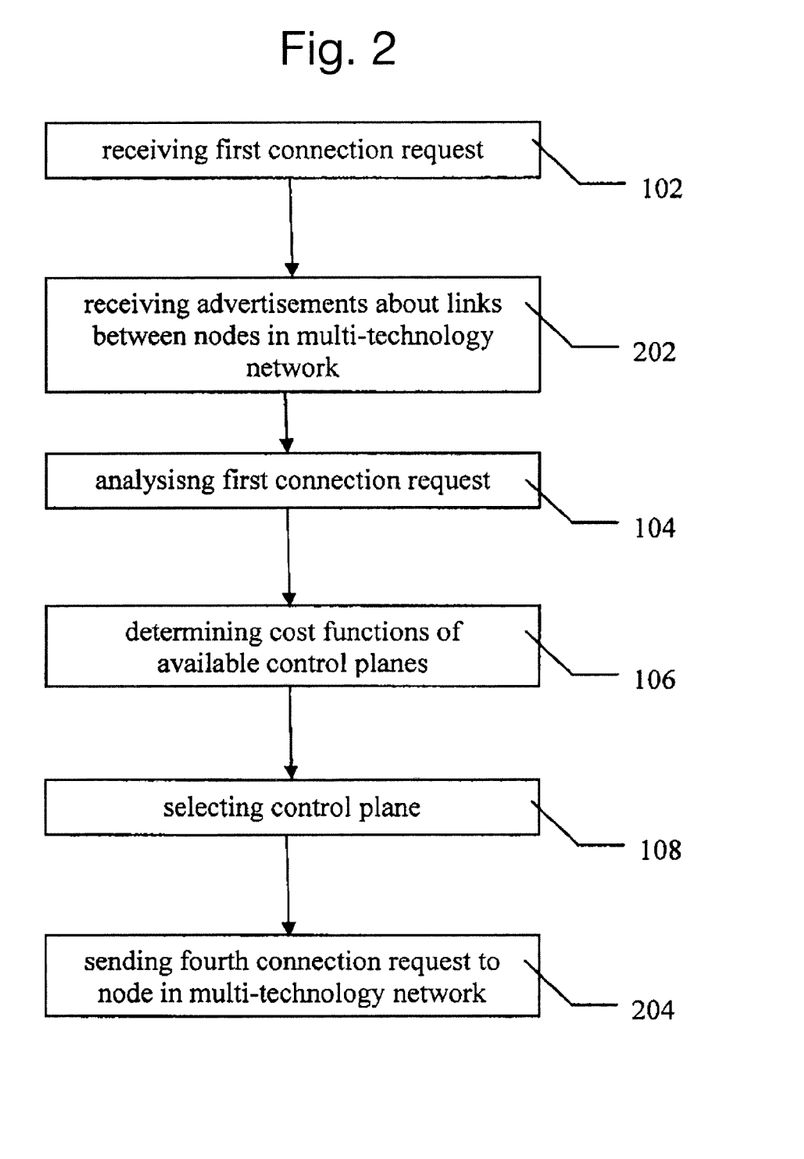
FIG. 2 is a flow chart illustrating method of provisioning a control plane in a multi-technology network in an alternative embodiment of the present invention.

In another embodiment, illustrated in FIG. 8 and FIG. 2, a dispatcher 300 is implemented in an edge router 302 in a client network 300. A first connection requests is received by the edge router 302 from another router in the client network 650 or from a subscriber (not shown) operating in the client network 650. Difference between this embodiment and the centralised and distributed ones discussed earlier is that this time the dispatcher is implemented as part of the edge router 302—i.e. the dispatcher is located in the client network. The connection request is then processed by the dispatcher 300 implemented in the edge router 302 before it is sent to the multi-technology communications network 800. In order to implement this embodiment the method comprises receiving advertised information 202 about links between network elements (servers) in the multi-technology network 800. In the step of selecting 108 the dispatcher 300 chooses links from the advertised links to create a path across the multi-technology network 800. Preferably the dispatcher 300 sends a fourth connection request 204 to a network element 802 (server) in the multi-technology network 800 to implement said path. In a preferred embodiment the dispatcher triggers sending the fourth connection request by the edge router 302. Preferably the fourth connection request is sent to a network element (server) in the multi-technology network over an Overlay Network Interface.

It is important to note that in the case of ONI interface the requests from the IP client layer are no longer triggering a path computation in the server layer, but a number of potential paths between pairs of transport nodes in the server layer is computed a priori and advertised to the routers directly connected to the ONI interfaces. The example shown in FIG. 8 illustrates how the server layer node S1—802 provides its peering router R2—302 with a set of potential feasible paths towards any other border node in the server network. The router R2—302, when new bandwidth is needed, chooses among the available potential paths and asks S1 to provision it. The potential virtual links, in the case of multi-technology server layer nodes, are associated to any combination of server layer control plane, so that the dispatcher 300 located in the client border router R2—302 is able to choose not only the potential link but also the technology or technologies used to implement it.

In the bottom part of FIG. 8 it is shown that the router R2—302 choice was the link between server node S1—802 and server node S4—804 using a dual stage control plane relationship spanning through the OTN and the WDM control planes.

Figure 9:
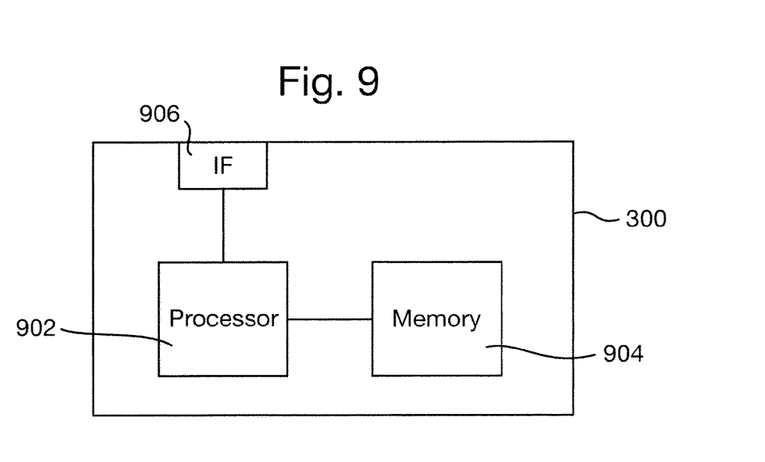
FIG. 9 is a diagram illustrating a dispatcher for provisioning a control plane in a multi-technology network in one embodiment of the present invention.

With reference to FIG. 9 an embodiment of a dispatcher 300 in accordance with embodiment of the present invention is presented. The dispatcher is configured for provisioning a control plane in a multi-technology network 600, 700, 800 in response to a connection request. The dispatcher 300 comprises a processor 902 and a memory 904, wherein said memory 904 contains instructions executable by said processor 902. Although not part of the invention, the dispatcher also comprises an interface 906 for communication with other elements of the server network, 600, 700, 800, and/or the client network, 650. By executing the instructions stored in the memory 904 the dispatcher 300 is configured to receive 102 a first connection request from a client 302 and to analyse 104 said first connection request. The dispatcher if further configured to select 108 a control plane based on results of the analysis and characteristics of control planes at the disposal of the dispatcher 300 in the multi-technology network 600, 700, 800.

As discussed earlier the dispatcher 300 may be implemented in a server node 602 of the multi-technology network 600 if the control plane is distributed or it can be implemented in a central controller 702 if the control plane is centralised. In yet another embodiment the dispatcher 300 may be implemented in an edge router 302 in a client network 650. The dispatcher 300 may be implemented as a software or hardware module in the elements discussed above. In yet another alternative embodiment the dispatcher may be a standalone hardware device, but this implementation would require managing traffic in such a way that connection requests are diverted to the dispatcher before these connection requests reach a server node, a network controller or an edge router depending on the specific implementation of the server network 600, 700 or 800.

It is important to understand that the complexity of the algorithm implementing the dispatcher depends mainly on the set of criteria chosen (customer, provider, network), so it is possible to allow for a trade-off between speed and optimization. Optimisation of the server network (multi-technology network) resources is achieved by distributing traffic allocation always taking into account the transport technology that can better satisfy the service characteristics as well as resource availability inside the multi-technology environment (e.g. network congestion, reliability and resiliency). By implementing the dispatcher 300 the Network Operator can select not only the best transport option for a client based on the characteristics of its request, but also take into account the status of the network in the moment the request is received and thus make a decision which allows the best use of the available network resources. This means that in case a client request can be satisfied by more than one solution, the final choice can take into account the cost of each solution from a network perspective. This has really nothing to do with the client request, which in this example would be satisfied anyway, but is really an additional tool that the Network Operator can exploit to be more profitable, or indeed to take advantage of its network in a smart and efficient way.

The invention claimed is:

1. A method of provisioning a control plane in a multi-technology network in response to a first connection request from a client, the method comprising:
   receiving the first connection request at a control plane dispatcher;
   analysing said first connection request;
   selecting a control plane from a plurality of control planes at the disposal of the dispatcher based on results of the analysis and characteristics of the plurality of control planes at the disposal of the dispatcher in the multi-technology network,
   wherein the step of analysis comprises assessing whether there are service-related requirements associated with said first connection request and if so, taking the service-related requirements into consideration when performing the step of selecting.

2. The method according to claim 1 wherein the service-related requirements associated with said first connection request include one or more of protection, restoration, jitter, and latency.

3. The method according to claim 1 wherein constraints of the multi-technology network are considered in the step of selecting a control plane, wherein the constraints comprise one or more of available resources, compatibility, link cost, and shared risk link group.

4. The method according to claim 1 wherein preferences of a provider of the multi-technology network are considered in the step of selecting a control plane.

5. The method according to claim 1 comprising determining cost functions for control planes available in the multi-technology network and using the cost functions in the step of selecting.

6. The method according to claim 5 wherein the control plane characterised by a lowest cost function is selected.

7. The method according to claim 1 comprising sending to a server associated with the selected control plane a second connection request representative of the first connection request received from the client.

8. A dispatcher for provisioning a control plane in a multi-technology network comprising a processor and a memory, said memory containing instructions executable by said processor whereby said dispatcher is operative to:
 receive a first connection request from a client;
 analyse said first connection request;
 select a control plane from a plurality of control planes at the disposal of the dispatcher based on results of the analysis and characteristics of the plurality of control planes at the disposal of the dispatcher in the multi-technology network,
 wherein analysing said first connection request comprises assessing whether there are service-related requirements associated with said first connection request and if so, taking the service-related requirements into consideration when performing the step of selecting.

9. The dispatcher according to claim 8 wherein the service-related requirements associated with said first connection request include one or more of protection, restoration, jitter, and latency.

10. The dispatcher according to claim 8 operative to consider constraints of the multi-technology network in selecting the control plane, wherein the constraints comprise one or more of available resources, compatibility, link cost, and shared risk link group.

11. The dispatcher according to claim 8 operative to consider preferences of a provider of the multi-technology network in selecting a control plane.

12. The dispatcher according to claim 8 operative to determine cost functions for control planes available in the multi-technology network and use the cost functions in selecting the control plane.

13. The dispatcher according to claim 12 operative to select the control plane characterised by a lowest cost function.

14. The dispatcher according to claim 8 operative to send to a server associated with the selected control plane a second connection request representative of the first connection request received from the client.

15. The dispatcher according to claim 8 operative to send to a controller of the multi-technology network a third connection request representative of the first connection request as well as an indication of the control plane selected in response to the first connection request.

16. The dispatcher according to claim 8 wherein the first connection request is received over a User to Network Interface.

17. The dispatcher according to claim 8 located in the client and operative to receive advertised information about links between network elements in the multi-technology network and in selecting the control plane the dispatcher is operative to choose links from the advertised links to create a path across the multi-technology network.

18. The dispatcher according to claim 17 operative to cause sending a fourth connection request to a network element in the multi-technology network to implement said path.

19. The dispatcher according to claim 17 wherein the fourth connection request is sent over an Overlay Network Interface.

20. A network element comprising a control plane dispatcher as defined in claim 8.

* * * * *